Figure 1:
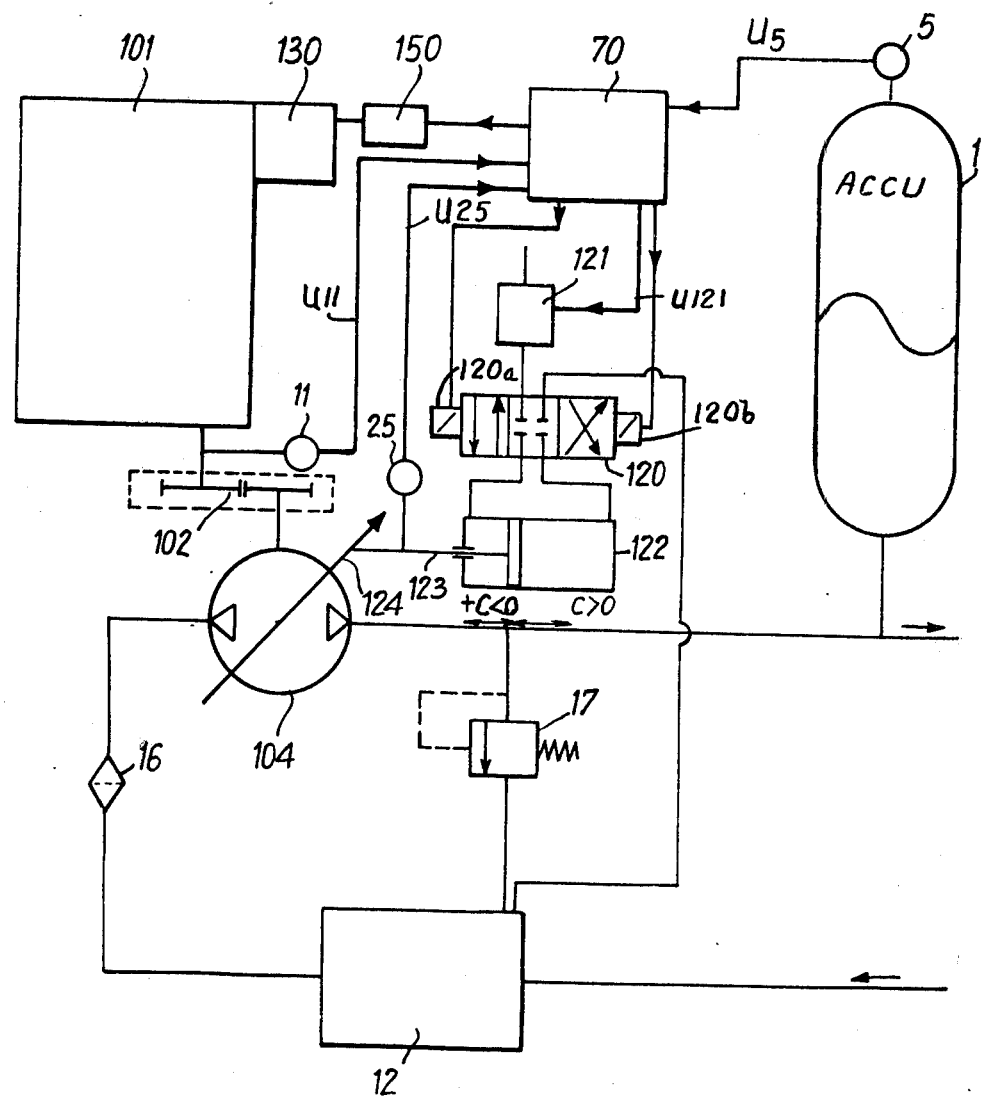

United States Patent [19]

Baudoin

[11] 4,064,694
[45] Dec. 27, 1977

[54] CHARGING AN ACCUMULATOR BY A HEAT ENGINE

[75] Inventor: Patrice Baudoin, Boulogne-Billancourt, France

[73] Assignee: Regie Nationale des Usines Renault, Boulogne-Billancourt, France

[21] Appl. No.: 738,958

[22] Filed: Nov. 4, 1976

[30] Foreign Application Priority Data

Nov. 6, 1975 France .................................. 75.33909

[51] Int. Cl.$^2$ .......................... F15B 1/02; F16H 39/46
[52] U.S. Cl. ....................................... 60/413; 60/418; 60/DIG. 2
[58] Field of Search ................. 60/408, 409, 410, 413, 60/414, 418, DIG. 2

[56] References Cited
U.S. PATENT DOCUMENTS

| | | | |
|---|---|---|---|
| 2,326,821 | 8/1943 | Boyle ....................................... | 60/418 |
| 2,827,763 | 3/1958 | Govan et al. ............................ | 60/414 |
| 3,922,854 | 12/1975 | Coeurderoy ............................. | 60/413 |

Primary Examiner—Edgar W. Geoghegan
Attorney, Agent, or Firm—Fleit & Jacobson

[57] ABSTRACT a. Charging an oleopneumatic accumulator with energy.

b. Automatic charging of the oleopneumatic accumulator (1) by the intermediary of the heat engine (101) driving the hydraulic pump with variable displacement (104), whose displacement is altered with the aid of a jack (122) supplied by a three-position valve (120), provided with two control coils (120a and 120b). A logic block (70) is connected to a sensor (5) of the accumulator pressure, to a speed sensor (11) of the rotation of the engine, and to a sensor (25) of the displacement of the pump (104) and produces control signals for the two coils (120a and 120b) and for a discharge electrovalve (121).

c. Used for hybrid vehicles or for storing energy in oleopneumatic form.

9 Claims, 5 Drawing Figures

CHARGING AN ACCUMULATOR BY A HEAT ENGINE

The present invention relates to the charging of an accumulator by a heat engine driving a hydraulic pump and more precisely to a device ensuring the automatic charging of an oleopneumatic accumulator by the intermediary of a heat engine driving a hydraulic pump of variable displacement.

Hybrid vehicles are already known, provided with a hydrostatic transmission and an oleopneumatic accumulator (Product Engineering, October 1973: transport conference at DENVER in September 1973).

In this type of vehicle, an oleopneumatic accumulator serves to store energy. The energy is conducted to the accumulator in the form of a discharge of hydraulic fluid, when the discharge of the transmission pump is greater than the discharge taken in by the hydraulic engine. Inversely, some energy is returned in the form of a flow of hydraulic fluid conveyed to the hydraulic engine when the discharge of the pump is less than the discharge of the hydraulic engine. It is also possible to recover the energy normally wasted in the brakes by the reversal of the engine's direction of flow, so that it functions as a pump supplying a flow of fluid to the accumulator.

One of the problems posed by hybrid vehicles of the above-mentioned type is the necessity of having available at all times an adequate reserve of energy in the accumulator.

This involves an accumulator discharging through one or several hydraulic engines as a function of the energy requirement of a consumer. It is therefore advisable to maintain at all times in the accumulator a charge of energy which is sufficient to meet the needs of the consumer.

A pump of variable displacement is available for recharging the accumulator, being made to operate by the intermediary of a heat engine operating intermittently.

When the pressure in the accumulator falls below a first listed value $P_1$, the heat engine is started up after the reconnecting of its ignition by the hydraulic pump operating as a motor. By controlling the displacement of the pump, the adjustment thus ensures the charging of the accumulator, the heat engine supplying a predetermined power for a predetermined rotational speed. The supply conditions of the heat engine are fixed which indicates, for example that the gas butterfly valve is locked in a certain position. It should be noted that the torque and power supplied by the heat engine are thus functions only of its rotational speed. Therefore, the charging of the accumulator may take place at an operation point of the power-speed plan of the heat engine corresponding to a minimum, specific consumption and to reduced emissions of pollutants. When the pressure in the accumulator exceeds a second listed value $P_2$, the adjustment switches off the heat engine by cutting the ignition, or supply in the case of a diesel and returns the displacement of the pump to zero.

The process according to the invention, which allows the pressure to be maintained inside an oleopneumatic accumulator, between two listed pressures $P_1$ and $P_2$, with $P_1$ less than $P_2$ by means of a heat engine driving a hydraulic pump of variable displacement used for charging the accumulator, $P_2$ being the maximum pressure inside the accumulator, is characterised in that:

if the pressure inside the accumulator is greater than $P_1$, when the engine is switched off and the ignition cut off, the regulation maintains a zero displacement for the pump, if the pressure inside the accumulator is less than $P_1$, when the engine is switched off, the regulation reconnects the ignition and brings the pump to operate as a motor, it renders its cubic capacity negative until in mechanical abutment, while the rotational speed $\omega$ of the engine is less than a speed $\omega_0$ from which the engine may accelerate by itself, if $\omega$ exceeds $\omega_0$, the displacement C of the hydraulic pump is increased, becomes positive and the regulation selects the value of it so that it is greater than a value $C_2$ in order to avoid racing the engine, the regulation therefore controls the displacement C of the pump so that the rotational speed of the heat engine remains within a small range around a value $\omega_1$, if the pressure inside the accumulator exceeds $P_2$, the regulation cuts off the ignition and thus returns the angular speed $\omega$ of the engine to zero and also the displacement C of the pump. The invention also relates to a device ensuring the automatic charging of an oleopneumatic accumulator by the intermediary of a heat engine driving a hydraulic pump having displacement which is variable by means of effecting the preceding process, of the type comprising a pressure sensor supplying a voltage proportional to the pressure in the accumulator, a speed sensor supplying a voltage proportional to the rotational speed of the heat engine, and a sensor of the displacement of the pump supplying a voltage proportional to the displacement of the hydraulic pump, and a logic block connected by its inputs to these three sensors, which is characterised in that the logic block is connected by its outputs: to the ignition coil of the heat engine by the intermediary of a relay, to a discharge electrovalve supplying a discharge proportional to its supply voltage, and to control coils of a three-position valve supplying the chambers of a jack.

Figure 2:
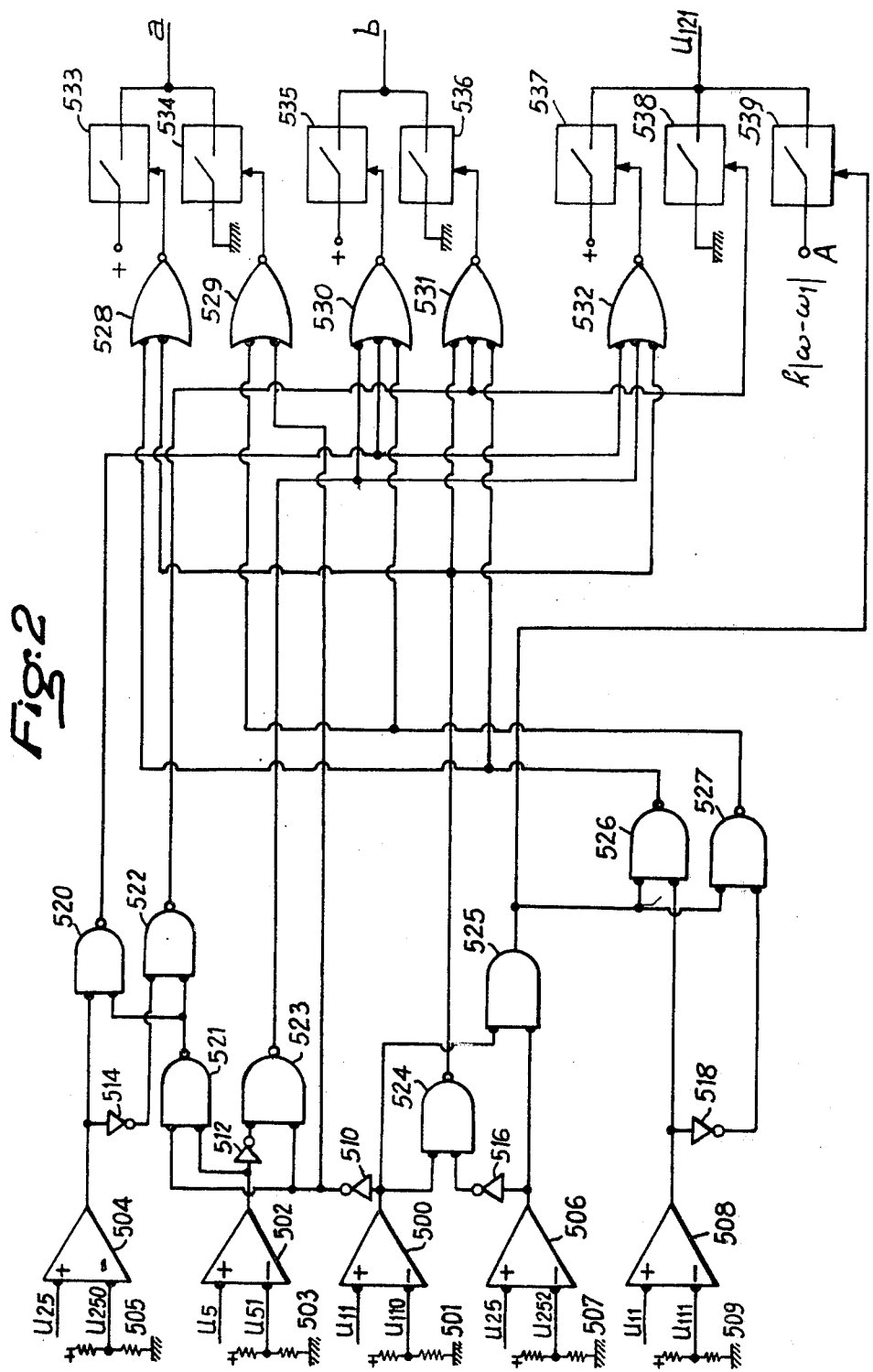
Figure 3:
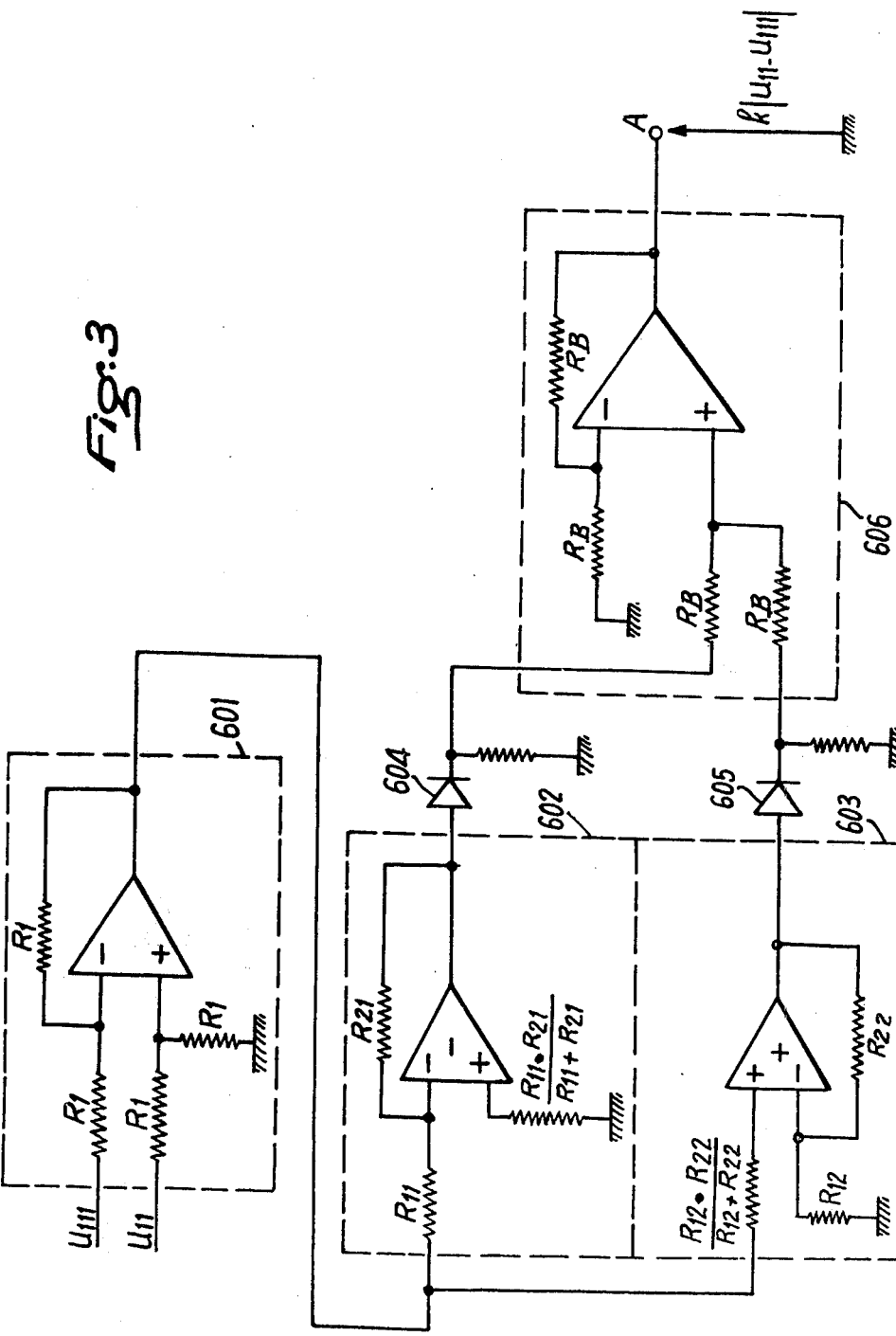
Figure 4:
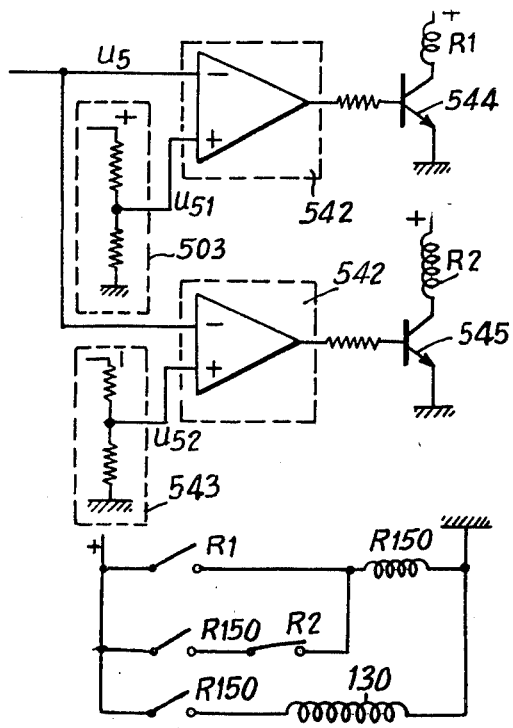
Figure 5:
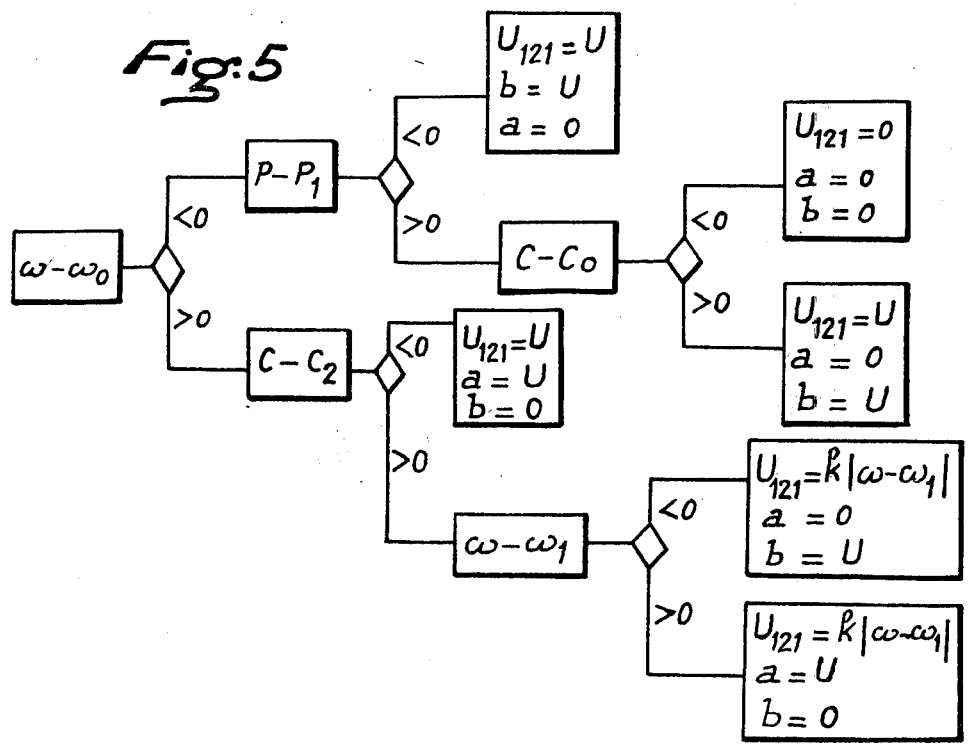

Other characteristics will be apparent from the ensuing description, which is given merely by way of an example. To this effect, reference is made to the attached drawings, in which:

FIG. 1 represents the hydraulic diagram of an embodiment of the device ensuring the automatic charging of an oleopneumatic accumulator according to the invention, FIG. 2 represents the electric diagram of an embodiment of a first part of the logic block, FIG. 3 represents the electrical diagram of an embodiment of an electronic device for generating an intermediate voltage, FIG. 4 represents the electrical diagram of an embodiment of a second part of the logic block, and FIG. 5 is a diagram explaining the operation of the logic associated with the device according to the invention.

In FIG. 1 a heat engine 101 drives a hydraulic pump of variable and reversible displacement 104 by the intermediary of a speed reducer or multiplier state 102. The pump of variable displacement 104 is connected to a pressurized tank 12 through the intermediary of a filter 16, and one or several hydraulic engines which have not been represented and which are assumed to be supplied with energy through the intermediary of an oleopneumatic accumulator 1 which is expediently maintained at a satisfactory pressure P comprised between the extreme pressures $P_1$ and $P_2$ such as:

$$P_1 < P < P_2.$$

The hydraulic engine or engines represented have a return to the pressurized tank 12.

The case of a pressurized tank 12 only is considered. It would be within the scope of an expert to replace this pressurized tank by a tank at atmospheric pressure connected to a force pump, controlled by its delivery pressure.

A valve 17 for limiting the pressure, calibrated to a pressure $P_3$ greater than $P_2$, protects the accumulator 1 against possible excessive pressures.

The control lever 124 of the displacement of the hydraulic pump 104 is connected to a rod 123 of the piston of a jack 122, the chambers of which are connected to a three-position valve 120 whose two control coils have the respective reference numerals 120a and 120b. The displacement C of the hydraulic pump 104 bears proportion to the position of the piston of the jack 122. A discharge electrovalve 121 is connected between an output of the logic control block 70 and an input of the three-position valve 120 for supplying a discharge proportional to its supply voltage U 121. A pressure sensor 5 connected to the oleopneumatic accumulator 1 produces a voltage $U_5$ proportional to the pressure inside the accumulator. A sensor 25 of the displacement of the hydraulic pump 104 connected to the position of the rod 123 of the piston of the jack 122 produces a voltage $U_{25}$, proportional to the displacement of the hydraulic pump 104. A speed sensor 11 produces a voltage $U_{11}$, proportional to the rotational speed of the heat engine 101.

The logic control block 70 is connected by its inputs to the sensors of pressure 5, of speed 11 and of displacement 25 in order to receive the voltages $U_5$, $U_{11}$ and $U_{25}$, respectively proportional to the pressure of the accumulator 1, to the rotational speed $\omega$ of the heat engine 101 and to the displacement C of the hydraulic pump 104. The sensors are of a known type.

The logic block 70 controls through its outputs respectively: the displacement of the pump 104 by its connections to the control coils 120a and 120b and to the discharge electrovalve 121, the connection or the cutting out of the supply of the ignition coil 130 of the heat engine 101 by the intermediary of a relay 150.

It will be noted that the sensor 25 produces a voltage $U_{25}$, proportional to the displacement of the pump 104 which is in the form $U_{25} = k (C - C_1)$, in which $C_1$ is the value of C for $U_{25} = 0$ (the most negative displacement).

For $C_1 < C < O$ the pump 104 functions as a motor. Thus the voltage $U_{25}$ always remains positive or nil.

In FIG. 2, which illustrates the first part of an embodiment of the logic control block 70, a series of comparators can be seen in the left-hand section, connected as follows from top to bottom:

a first comparator 504 receiving at its positive input the voltage $U_{25}$, supplied by the sensor 25 and at its negative input a voltage $U_{250}$ supplied by a potential-divider 505, the voltage $U_{250}$ corresponding to the value $U_{25}$ for $C = C_0$, a second comparator 502 receiving at its positive input the voltage $U_5$, supplied by the sensor 5 and at its negative input a voltage $U_{51}$, supplied by a potential-divider 503, the voltage $U_{51}$ corresponding to the value of $U_5$ for $P = P_1$, a third comparator 500 receiving at its positive input the voltage $U_{11}$, supplied by the sensor 11 and at its negative input a voltage $U_{110}$, supplied by a potential-divider 501, the voltage $U_{110}$ corresponding to the value of $U_{11}$, for $\omega = \omega_0$, a fourth comparator 506 receiving at its positive input the voltage $U_{25}$, supplied by the sensor 25 and at its negative input a voltage $U_{252}$, supplied by a potential-divider 507, the voltage $U_{252}$ corresponding to the value of $U_{25}$ for $C = C_2$, a fifth comparator 508 receiving at its positive input the voltage $U_{11}$, supplied by the sensor 11 and at its negative input a voltage $U_{111}$, supplied by a potential-divider 509, the voltage $U_{111}$ corresponding to the value of $U_{11}$ for $\omega = \omega_1$.

Inverters 514, 512, 510, 516 and 518 are placed respectively on the outputs of the comparators 504, 502, 500, 506 and 508. Logical AND-gates 520 to 527 and logical OR-gates 528 to 532 allow control signals to be formed suitable for the analogical commutators 533 to 539. The outputs of the first two analogical commutators 533 and 534 are connected in parallel to produce the voltage $a$ intended for the control coil 120a. The outputs of the two successive analogical commutators 535 and 536 are also connected in parallel to supply the voltage $b$ for the control coil 120b. Finally, the outputs of the last three analogical commutators 537 to 539 are again connected in parallel to supply the voltage $U_{121}$ for controlling the discharge electrovalve 121. The inputs of the commutators are either the battery positive terminal (533, 535, 537) or the earth (534, 536, 538) or a voltage $K |\omega = \omega_1|$ (commutator 539), calculated as shown in FIG. 3.

In FIG. 3 an operational differential amplifier 601 can be seen, receiving on its positive input the voltage $U_{11}$ supplied by the sensor 11 and on its negative input, the voltage $U_{111}$ tapped on the divider 509 at the bottom of FIG. 2.

The signal at the output is proportional to $U_{11} - U_{111}$ with a resistance $R_1$ in the path of feedback. The output of the differential amplifier 601 is connected in parallel at the negative input of an inverter amplifier 602 and at the positive input of a non-inverter amplifier 603. The positive input of the inverter amplifier 602 is connected to the earth by the intermediary of a resistance of value $$\frac{R_{11} \cdot R_{21}}{R_{11} + R_{21}}$$

in which $R_{11}$ is the value of the resistance arranged in series on the negative input of the amplifier 602, and $R_{21}$ is the value of the resistance arranged in the path of feedback of the same amplifier. At the output of the inverter amplifier 602, a diode 604 is arranged in series and a resistance at the earth so that the signal obtained has the value $- R_{21}/R_{11} (U_{11} - U_{111})$.

At the positive input of the non-inverter amplifier 603 connected to the output of the differential amplifier 601 there is arranged in series a resistance of value $$\frac{R_{12} \cdot R_{22}}{R_{12} + R_{22}}$$

in which $R_{12}$ is the value of a resistance arrranged between the earth and the negative input of the non-inverter amplifier 603 and $R_{22}$ is the value of a resistance arranged in the path of feedback of the same amplifier. At the output of the non-inverter amplifier 603 there is arranged a diode 605 and a resistance at the earth so that the signal obtained has the value:

$$\frac{R_{12} + R_{22}}{R \cdot 12} (U_{11} - U_{111})$$

one selects:

$$\frac{R_{21}}{R_{11}} = \frac{R_{22} + R_{22}}{R_{12}} = k.$$

The outputs of the inverter amplifier 602 and of the non-inverter amplifier 603 are connected in parallel at the positive input of a summation amplifier 606 by the intermediary of resistances $R_B$. The negative input of this summation amplifier 606 is at the earth by the intermediary of a resistance $R_B$ which is also the value selected for the resistance arranged in the path of feedback of the summation amplifier 606. In these conditions between point A of the output of this amplifier and the earth, a signal of value K $|U_{11} - U_{111}|$ is obtained and this signal is carried back to the input A of the analogical commutator 539 of FIG. 2.

In FIG. 4, which represents the second part of the logic block 70 corresponding to the device for cutting out and reconnecting the supply to the ignition coil 130 of the heat engine 101, two relay coils $R_1$ and $R_2$ can be seen, each connected between the positive battery terminal and the earth by the intermediary of the emitter-collector junction of the respective transistors 544 and 545. The base of each of these transistors is connected to the output of a separate comparator 542. The negative inputs of the two comparators 542 are connected in parallel in order to receive the voltage $U_5$ from the pressure sensor 5. The positive input of the comparator 542 connected to the transistor 544 is connected to the middle point of the potential-divider 503, already used in FIG. 2, to obtain the voltage $U_{51}$, while the positive input of the comparator 542, connected to the transistor 545, is connected to the middle point of a potential-divider 543, supplying a reference voltage $U_{52}$ which is corresponding to the value of $U_5$ for $P = P_2$.

The contact $R_1$ of the corresponding coil is connected in series with the coil $R_{150}$ of the relay 150 of FIG. 1 between the battery positive terminal and the earth. In parallel on the contact $R_1$ there is arranged the connection in series of a first relay contact $R_{150}$ with a relay contact $R_2$ above, and in parallel on the contacts $R_{150}$, $R_2$ and the coil $R_{150}$ there is arranged the series connection of a second relay contact $R_{150}$ and of the coil 130.

The device in FIG. 4 functions as follows: the relay coil $R_1$ is only supplied if $U_5$ is less than $U_{51}$; likewise the relay coil $R_2$ is only supplied if $U_5$ is less than $U_{52}$. The coil 130 is only supplied if the relay contact $R_{150}$ is closed, i.e. when its coil is supplied. The coil $R_{150}$ is supplied when the relay $R_1$ is supplied, and then as long as $R_2$ is supplied, i.e. as long as the charging of the accumulator is not terminated ($P < P_2$). As soon as P exceeds $P_2$, the ignition is cut out. It is reconnected when P becomes less than $P_1$.

The operation of the device as a whole, ensuring the charging of an oleopneumatic accumulator by the intermediary of a heat engine driving a hydraulic pump of variable displacement according to the invention, is explained with particular reference to FIG. 5 which summarizes this operation: $\omega$ designating the rotational speed of the heat engine 101, C the displacement of the hydraulic pump 104 and P the pressure inside the accumulator 1. First of all the test is done on the rotational speed of the engine 101:

if $\omega$ is less than $\omega_0$, the value from which the engine may accelerate itself, and if P is greater than $P_1$, the minimum value allowable for the pressure inside the accumulator 1, C = o is selected: the engine is switched off, the accumulator 1 is not empty, the displacement of the pump 104 must remain at nil, if $\omega$ is less than $\omega_0$ and if P is less than $P_1$, C = + $C_1$ and a negative condition results. The pump 104 then operates as a motor for driving the heat engine 101 until it reaches the speed $\omega_0$ from which it can accelerate itself.

FIG. 5 shows in each case as a function of the tests successively carried out, which group of values is attained on the outputs of the control logic 70 in order to put the electro-hydraulic device in the required operating conditions.

if $\omega$ is greater than $\omega_0$ and if C is greater than $C_2$, the displacement C of the pump corresponds to $\omega = \omega_1$ in which $\omega_1$ is the rotational speed of the heat engine 101 which is selected for charging the accumulator 1.

During the charge, if $\omega$ is less than $\omega_1$, C must be reduced in order to reduce the opposing torque applied to the heat engine, so that $\omega$ increases.

On the other hand, if $\omega$ is greater than $\omega_1$, C must be increased in order to increase the opposing torque applied to the engine 101 so that $\omega$ is reduced. It is necessary to ensure $dc/dt = k (\omega - \omega_1)$ in order to avoid racing the engine. It is sufficient for the flow of supply fluid of the control jack 122 of the displacement control of the pump to be proportional to $|\omega - \omega_1|$ and for the controlling of the slide valve 120 to correspond to the following plan:

The priority condition C $\geqq$ $C_2$ allows an increase of the displacement and the start of the pump operation when the engine rate rises from the speed $\omega_0$.

This operation may be summarized as follows:

1. if the pressure in the accumulator 1 is greater than $P_1$, the engine 101 is switched off, the ignition coil 130 is cut out and the displacement of the pump 104 is nil, 2. with the engine still switched off, if the pressure in the accumulator drops below $P_1$, it is necessary to start the engine 101. To this effect, the ignition is reconnected and the pump 104 is brought to operate as a motor. The displacement is rendered negative by the control lever 124 while the speed of the engine 101 is less than the value from which it may accelerate itself, 3. as soon as the rotational speed of the engine exceeds this value, the displacement C of the pump must increase and become positive and also greater than a predetermined value $C_2$, so that the engine does not race.

4. the charging of the accumulator 1 then really begins, the displacement of the pump 104 is regulated so that the speed of the heat engine 101 is in a small range on either side of $\omega_1$.

5. as soon as the pressure in the accumulator 1 exceeds $P_2$, the ignition is cut, $\omega$ decreases to zero and also the displacement C of the pump.

The device according to the invention may be used in hybrid vehicles. It may also be used in all other fields, where it is advisable to use an energy source of a determined value, for example in hydraulic pumps of various models.

What is claimed as new is:

1. A method of regulating the pressure in an accumulator to obtain a pressure therein which lies between two predetermined values using a variable-displacement pump driven by an internal combustion engine to charge the accumulator, the method comprising the following steps:
   sensing and generating a signal representative of the pressure within the accumulator;
   placing the engine in an operable condition when the sensed pressure drops to a value below the lower of the two predetermined values and adjusting the pump to have a negative displacement so that it operates as a motor driven by fluid under pressure from the accumulator thereby driving the engine until the engine reaches a speed at which it is self-sustaining;
   increasing the displacement of the pump until it reaches a positive value after the engine has reached the self-sustaining speed thereby loading the engine;
   controlling the displacement of the pump to maintain the speed of the engine at or about a predetermined value; and
   placing the engine in an inoperable condition and adjusting the pump to have zero displacement when the sensed pressure in the accumulator exceeds the higher of the two predetermined values.

2. An arrangement comprising a fluid pressure accumulator, a variable displacement pump, an internal combustion engine connected for driving the variable-displacement pump to charge the accumulator, and control means, the control means including sensors for sensing the pressure in the accumulator, the speed of the engine and the displacement of the pump and being adapted to:
   a. put the engine into an operable condition and adjust the pump to have a negative displacement when the pressure in the accumulator drops to a value below the lower of two predetermined values;
   b. increase the displacement of the pump, when the engine reaches a self-sustaining speed, to a positive value and to control the displacement of the pump to maintain the speed of the engine at or about a predetermined value; and
   c. put the engine into an inoperable condition and adjust the pump to have a zero displacement when the pressure within the accumular rises to a value above the higher of the two predetermined values.

3. An arrangement according to claim 2, wherein said sensors are adapted to produce voltages respectively proportional to the pressure in the accumulator, the speed of the engine, and the displacement of the pump, the arrangement further comprising a logic block to which said voltages are applied and which is connected by its outputs to the ignition coil of the engine, through a relay; to a discharge electrovalve supplying a discharge proportional to its supply voltage; and to a three-position valve having control coils, the valve supplying the chambers of a jack constituting a control member for the displacement of the pump, said discharge electro-valve feeding said three-position valve.

4. Process according to claim 1, characterised in that the rate of rotation and the charge of the engine are kept constant after the displacement of the pump reaches a positive value.

5. Process according to claim 1, characterised in that the supply of the engine is kept fixed, for example the position of the gas butterfly valve is kept fixed, in the case of an engine with controlled ignition.

6. Device according to claim 3, characterised in that the logic block includes a first part which ensures the cutting out and reconnection of the supply of the ignition coil of the engine.

7. Device according to claim 3, characterised in that the logic block includes a second part, comprising at the input a series of comparators, each comparing a voltage received from a predetermined sensor to a reference voltage obtained from a potential-divider and in that the voltages obtained at the outputs of the comparators are combined with the aid of a set of inverters of logical AND-gates and of logical OR-gates in order to be finally applied to a set of analogical commutators.

8. Device according to claim 7 characterised in that the analogical commutators are grouped in groups of two with, within these groupings, an analogical commutator having its input at a battery positive terminal and a second analogical commutator having its input at the earth in order to obtain at the output of these groupings, the control signals of the control coils of the three-position valve and of the control sign of the discharge electrovalve, the grouping of analogical commutators supplying the control signal of the discharge electrovalve including a third analogical commutator receiving at its input (A) a signal produced elsewhere in the logic block.

9. Device according to claim 8, characterised in that the chain of elements producing the signal applied to the third analogical commutator is comprised as follows: a differential amplifier, connected by its positive input to the sensor of angular speed and by its negative input at the middle point of a potential-divider, supplying a voltage proportional to the angular speed $\omega_1$, this differential amplifier being connected by its output in parallel to the negative input of an inverting amplifier and of a non-inverting amplifier, the outputs of which are connected in parallel by the intermediary of diodes to the positive input of a summation amplifier, the output (A) of which is connected to the input of the third analogical commutator.

* * * * *